US011727444B2

(12) United States Patent
Elcock et al.

(10) Patent No.: US 11,727,444 B2
(45) Date of Patent: Aug. 15, 2023

(54) CUSTOMIZING TARGETED ADVERTISEMENTS BASED ON PROFILE INFORMATION EXCHANGE

(71) Applicant: ARRIS ENTERPRISES LLC, Suwanee, GA (US)

(72) Inventors: Albert F. Elcock, West Chester, PA (US); Christopher S. DelSordo, Souderton, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 991 days.

(21) Appl. No.: 14/662,485

(22) Filed: Mar. 19, 2015

(65) Prior Publication Data
US 2016/0275562 A1    Sep. 22, 2016

(51) Int. Cl.
G06Q 30/02        (2023.01)
G06Q 30/0251      (2023.01)
G06Q 30/0241      (2023.01)

(52) U.S. Cl.
CPC ..... *G06Q 30/0269* (2013.01); *G06Q 30/0277* (2013.01)

(58) Field of Classification Search
CPC ............... H04N 21/6582; H04N 21/44; G06Q 30/0269; G06Q 30/0241
USPC ............. 705/14.47, 14.69; 348/222.1, 385.1; 725/115, 51
See application file for complete search history.

(56) References Cited

U.S. PATENT DOCUMENTS

| 6,385,592 | B1 | 5/2002 | Angles et al. |
| 6,698,020 | B1 | 2/2004 | Zigmond et al. |
| 6,704,930 | B1 * | 3/2004 | Eldering ............ H04N 5/44543 348/385.1 |
| 7,925,973 | B2 | 4/2011 | Allaire et al. |
| 8,458,363 | B2 | 6/2013 | Rosenblatt et al. |
| 2005/0021398 | A1 * | 1/2005 | McCleskey ............ G06Q 30/02 705/14.47 |
| 2007/0078712 | A1 * | 4/2007 | Ott ........................ G06Q 30/02 705/14.69 |
| 2007/0192798 | A1 * | 8/2007 | Morgan .............. H04L 63/0272 725/51 |
| 2011/0043652 | A1 * | 2/2011 | King ................... G06F 17/2211 348/222.1 |
| 2012/0131629 | A1 * | 5/2012 | Shrum, Jr. ....... H04N 21/26233 725/115 |
| 2012/0173379 | A1 * | 7/2012 | Soroca .................. G06Q 30/08 705/26.3 |

(Continued)

OTHER PUBLICATIONS

Microsoft Computer Dictionary 232 (5th ed. 2002).*

*Primary Examiner* — Saba Dagnew
(74) *Attorney, Agent, or Firm* — Panitch Schwarze Belisario & Nadel LLC

(57) ABSTRACT

A device, system, and method implemented in a computer system for delivering targeted advertisements to a customer device on a network. A request is received from the customer device to download a media content file. Targeted advertisement opportunities are detected in the media content file. Profile data is received for the customer device, and targeted advertisements are received that relate to the profile data for the customer device. The media content file and the targeted advertisements are sent in response to the request from the customer device to download the media content file.

11 Claims, 8 Drawing Sheets

(56) References Cited

U.S. PATENT DOCUMENTS

| | | | |
|---|---|---|---|
| 2012/0297406 A1* | 11/2012 | Bartholomay | G06Q 30/0241 |
| | | | 725/9 |
| 2013/0074122 A1 | 3/2013 | Hicks, III et al. | |
| 2014/0279047 A1* | 9/2014 | Wang | G06Q 30/0269 |
| | | | 705/14.66 |
| 2014/0282786 A1* | 9/2014 | Lajoie | H04N 21/44 |
| | | | 725/115 |
| 2015/0163559 A1* | 6/2015 | Manchester | H04N 21/6582 |
| | | | 725/34 |

* cited by examiner

CUSTOMIZING TARGETED ADVERTISEMENTS BASED ON PROFILE INFORMATION EXCHANGE

BACKGROUND

A multiple system operator (MSO), such as an operator of multiple cable or direct-broadcast satellite television systems, delivers television programs and multimedia services as content streams to its subscribers or customers.

A hybrid fiber-coaxial (HFC) network is a broadband network that includes optical fiber and coaxial cable. The HFC network typically provides two-way communication between a cable operator's headend facility and a subscriber's location. The headend facility collects and processes communication signals, and distributes the signals to subscribers' locations using a downstream communication path. Customer premises equipment (CPE) at a subscriber's location, typical examples of which include a set-top box, gateway, or cable modem, receives the communication signals on the downstream communication path, and transmits other communication signals to the headend facility using an upstream communication path.

A subscriber typically desires to utilize digital video recorder (DVR) functionality to record and store the MSO content stream as a media content file, and playback the media content file on demand. The MSO either provides the subscriber with a CPE device that includes a DVR, or provides the subscriber with online access to DVR functionality via the HFC network (i.e., a network DVR (nDVR)). When the MSO provides the subscriber with a CPE device that includes a DVR, the subscriber operates the CPE device to record and store the MSO content stream as a media content file on the CPE device, and playback the recorded media content file on demand. When the MSO provides the subscriber with online access to an nDVR, the customer operates the CPE device to record and store the MSO content stream as a media content file on an HFC network device or third-party service, and playback the recorded media content file on demand via the HFC network.

A current focus for the typical MSO is the development of targeted advertisement technology. The MSO utilizes this technology to customize placement of targeted advertisements in the MSO content stream based on consumer behavior data, such as demographic and psychographic data, purchase history, observed behavior, or the like.

DETAILED DESCRIPTION

In a typical hybrid fiber-coaxial (HFC) network, customer premises equipment (CPE), such as telecommunications hardware located at the subscriber location, stores targeted advertisements from the multiple system operator (MSO), gathers the consumer behavior data, and serves the targeted advertisements based on consumer behavior data, also referred to as profile data, stored on the CPE device. When the CPE device is a gateway device, it also is capable of serving media content and video profile data to a network of customer devices typically connected via a wireless connection. In one embodiment, the network is a private network, such as a home wireless network, Wi-Fi network, mobile hot spot, or the like, for the CPE device. These customer devices typically do not include the hardware, programming, and HFC network infrastructure support that is necessary to provide the ability to store targeted advertisements and replace targeted advertisements in the media content. Thus, the gateway device typically serves the media content with targeted advertisements based on the consumer behavior data stored on the gateway device. It would be advantageous if the media content served to the customer devices included targeted advertisements based on consumer behavior data associated with each customer device.

Figure 1:
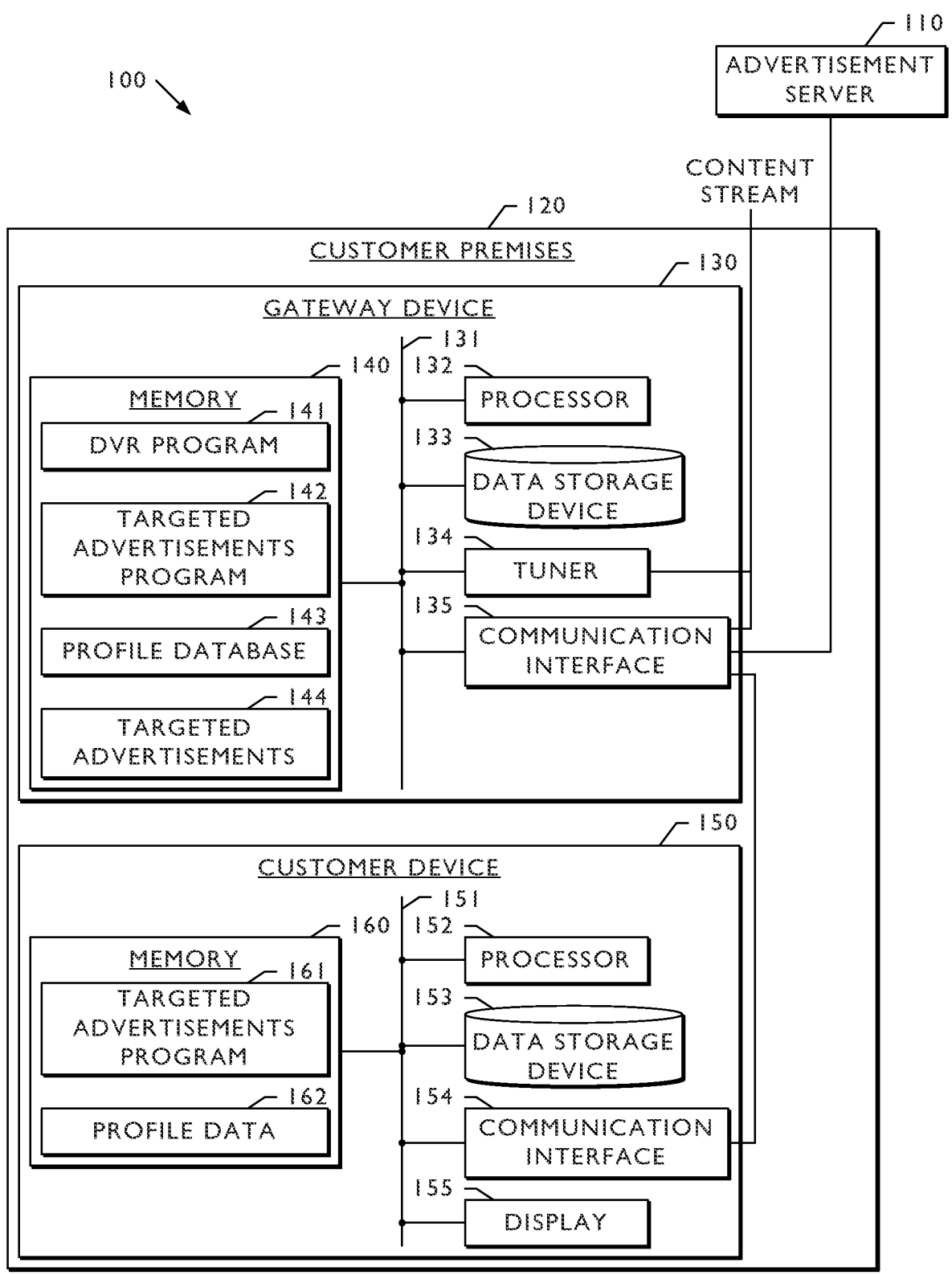
FIG. 1 is a block diagram that illustrates one embodiment of the hardware components of a system for delivering targeted advertisements.

FIG. 1 is a block diagram that illustrates one embodiment of the hardware components of a system for delivering targeted advertisements. The targeted advertisement system 100 shown in FIG. 1 includes an advertisement server 110, and customer premises 120 that includes a gateway device 130, and customer device 150. One skilled in the art will appreciate that the targeted advertisement system 100 shown in FIG. 1 may include any number of interconnected advertisement server 110, gateway device 130, and customer device 150 components.

The advertisement server 110 shown in FIG. 1 serves advertisement content to the gateway device 130. The advertisement server 110 connects to, and communicates with, the gateway device 130 via an HFC network (not shown). In one embodiment, the HFC network (not shown) includes router and server hardware that provides a content stream to the gateway device 130, and facilitates the communication between the advertisement server 110 and gateway device 130. In another embodiment, an Internet Protocol (IP) network (not shown) includes router and server hardware that provides the content stream to the gateway device 130, and facilitates the communication between the advertisement server 110 and gateway device 130.

The gateway device 130 shown in FIG. 1 is a CPE device that resides in the customer premises 120. The gateway device 130 is a multifunctional router device. The gateway device 130 includes cable modem functionality to receive television signals that are processed and distributed through the HFC network as a content stream from the MSO headend (not shown), and targeted advertisements from the advertisement server 110. In one embodiment, the gateway device 130 implements the Data Over Cable Service Interface Specification (DOCSIS) 3.0 standard. The gateway device 130 also includes Wi-Fi router functionality to communicate with the customer premises 120 network of at least one customer device 150. The gateway device 130 also includes programming and storage functionality to store targeted advertisements and replace targeted advertisements in a recorded media content file.

The customer device 150 shown in FIG. 1 is a customer premises 120 computing device, such as a mobile phone, smartphone, tablet computer, gaming console, handheld device, personal computer, consumer device, or the like. The customer operates the customer device 150 to receive the media content file from the gateway device 130, and communicate with the MSO headend (not shown) to access the MSO programming and Internet features.

FIG. 1 also illustrates, in detail, one embodiment of the gateway device 130. The gateway device 130 shown in FIG. 1 is a general-purpose computer. A bus 131 is a communication medium connecting a processor 132, data storage device 133 (such as a serial ATA (SATA) hard disk drive, optical drive, small computer system interface (SCSI) disk, solid state disk, flash memory, or the like), tuner 134, communication interface 135, and memory 140 (such as random access memory (RAM), dynamic RAM (DRAM), non-volatile computer memory, flash memory, or the like). The tuner 134 receives television signals that are processed and distributed through the HFC network as a content stream from the MSO headend (not shown). The tuner 134 utilizes drivers including quadrature amplitude modulation (QAM), IP, or the like. The communication interface 135 receives television signals that are processed and distributed through the HFC network as a content stream from the MSO headend (not shown), and targeted advertisements from the advertisement server 110. The communication interface 135 also communicates with the customer premises 120 network of at least one customer device 150, and allows for two-way communication of data and content between the gateway device 130, advertisement server 110, and MSO headend (not shown).

The processor 132 of the gateway device 130 performs the disclosed methods by executing sequences of operational instructions that comprise each computer program resident in, or operative on, the memory 140. The reader should understand that the memory 140 may include operating system, administrative, and database programs that support the programs disclosed in this application. In one embodiment, the configuration of the memory 140 of the gateway device 130 includes a digital video recorder (DVR) program 141, targeted advertisements program 142, profile database 143, and targeted advertisements 144. The DVR program 141, targeted advertisements program 142, profile database 143, and targeted advertisements 144 are operative components to perform the methods disclosed in the exemplary embodiments depicted in FIG. 2 and FIG. 3. When the processor 132 performs the disclosed methods, it stores intermediate results in the memory 140 or data storage device 133. In another embodiment, the processor 132 may swap these programs, or portions thereof, in and out of the memory 140 as needed, and thus may include fewer than all of these programs at any one time.

FIG. 1 also illustrates, in detail, one embodiment of the customer device 150. The customer device 150 shown in FIG. 1 is a general-purpose computer. A bus 151 is a communication medium connecting a processor 152, data storage device 153 (such as a serial ATA (SATA) hard disk drive, optical drive, small computer system interface (SCSI) disk, solid state disk, flash memory, or the like), communication interface 154, display 155, and memory 160 (such as random access memory (RAM), dynamic RAM (DRAM), non-volatile computer memory, flash memory, or the like). The communication interface 154 communicates with the gateway device 130 for the customer premises 120 network. The display 155 is the operator interface for the customer device 150, and displays the media content file received from the gateway device 130.

The processor 152 of the customer device 150 performs the disclosed methods by executing sequences of operational instructions that comprise each computer program resident in, or operative on, the memory 160. The reader should understand that the memory 160 may include operating system, administrative, and database programs that support the programs disclosed in this application. In one embodiment, the configuration of the memory 160 of the customer device 150 includes a targeted advertisements program 161, and profile data 162. The targeted advertisements program 161, and profile data 162 are operative components to perform the methods disclosed in the exemplary embodiments depicted in FIG. 2 and FIG. 3. When the processor 152 performs the disclosed methods, it stores intermediate results in the memory 160 or data storage device 153. In another embodiment, the processor 152 may swap these programs, or portions thereof, in and out of the memory 160 as needed, and thus may include fewer than all of these programs at any one time.

Figure 2:
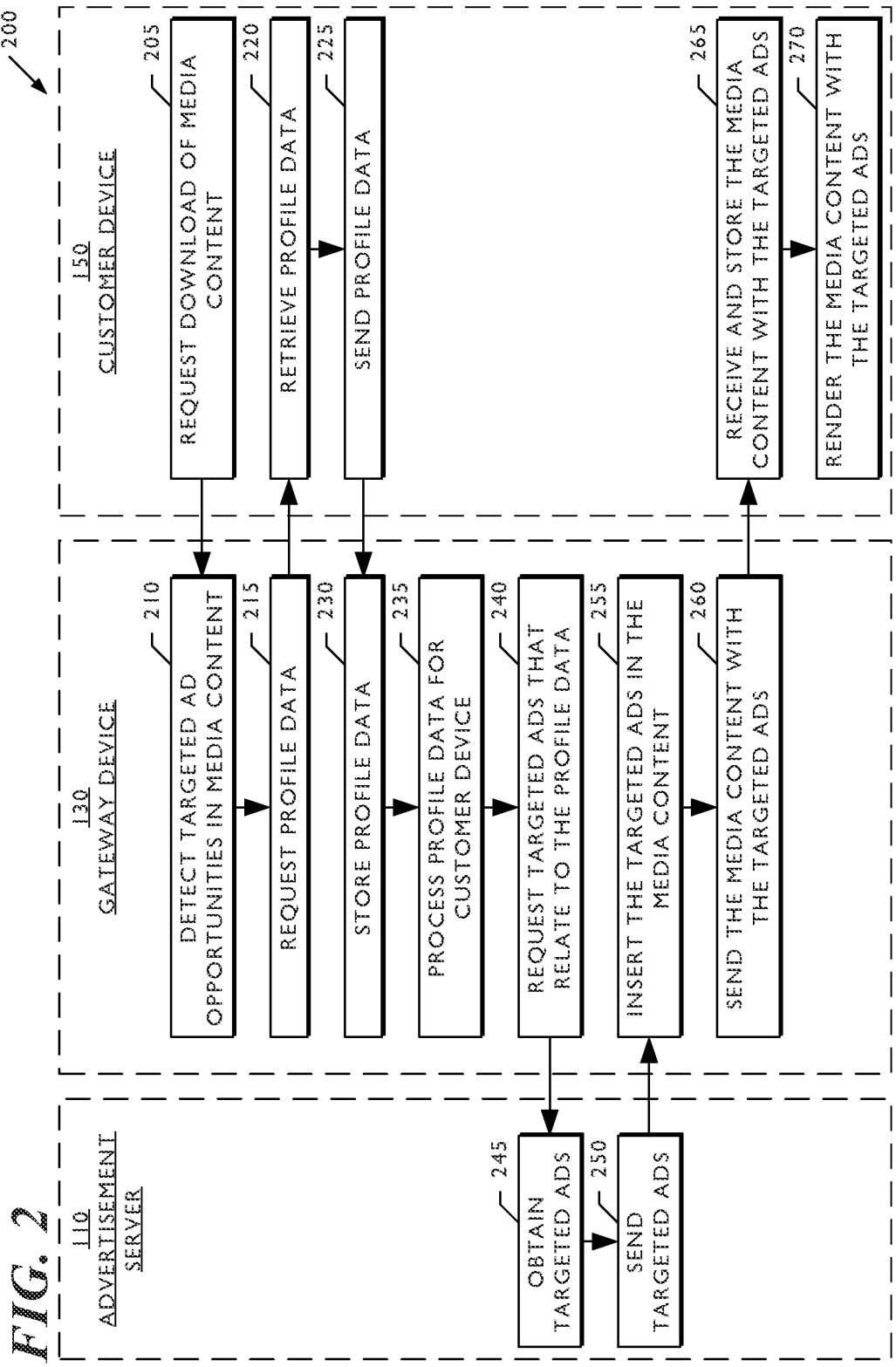
FIG. 2 is a flow diagram that illustrates one embodiment of a method performed by the system for delivering targeted advertisements shown in FIG. 1.

FIG. 2 is a flow diagram that illustrates one embodiment of a method performed by the system for delivering targeted advertisements shown in FIG. 1. The process 200 shown in FIG. 2, with reference to FIG. 1, begins when the customer device 150 sends a request to the gateway device 130 to download a media content file (step 205). In one embodiment, the request to download the media content file is initiation of the transference of the media content file. In one embodiment, the gateway device 130 records and stores the media content file. In one embodiment, before the customer device 150 sends the request to download the media content file, the gateway device 130 verifies that the customer device 150 is an authenticated device in the customer premises 120 network.

After receiving the request to download the media content file from the customer device 150, the process 200 continues when the gateway device 130 obtains the media content file, detects a targeted advertisement opportunity in the media content file (step 210), and sends a request for profile data to the customer device 150 (step 215). In one embodiment, the profile data for the customer device 150 pertains to the behavior of the consumer who typically operates the customer device 150. In another embodiment, the profile data for the customer device 150 pertains to characteristic data for the customer device 150, such as video format, or the like. The customer device 150 receives the request and retrieves the profile data for the customer device 150 (step 220). The customer device 150 sends the profile data to the gateway device 130 (step 225). The gateway device 130 receives and stores the profile data for the customer device 150 (step 230).

After receiving the profile data, the process 200 continues when the gateway device 130 processes the profile data for the customer device 150 (step 235), and sends a request to the advertisement server 110 for targeted advertisements that relate to the profile data (step 240). In one embodiment, targeted advertisements that relate to the profile data for the customer device 150 are targeted advertisements customized and selected based on the behavior of the consumer of the customer device 150 as described in the profile data. In another embodiment, targeted advertisements that relate to the profile data for the customer device 150 are targeted advertisements resulting from a query, where search criteria for the query comprise the profile data for the customer device 150, and where each targeted advertisement satisfies, or matches, at least one search criterion. The advertisement server 110 receives the request for targeted advertisements, obtains targeted advertisements that relate to the profile data (step 245), and sends the targeted advertisements to the gateway device 130 (step 250). The gateway device 130 receives the targeted advertisements from the advertisement server 110, and inserts the targeted advertisements in the media content file (step 255). In one embodiment, the insertion of the targeted advertisements replaces the targeted advertisement opportunities in the media content file with the targeted advertisements received from the advertisement server 110. The gateway device 130 sends the media content file with the targeted advertisements to the customer device 150 (step 260). The customer device 150 receives and stores the media content file with the targeted advertisements (step 265), and renders the media content file with the targeted advertisements on the display 155 (step 270).

Figure 3:
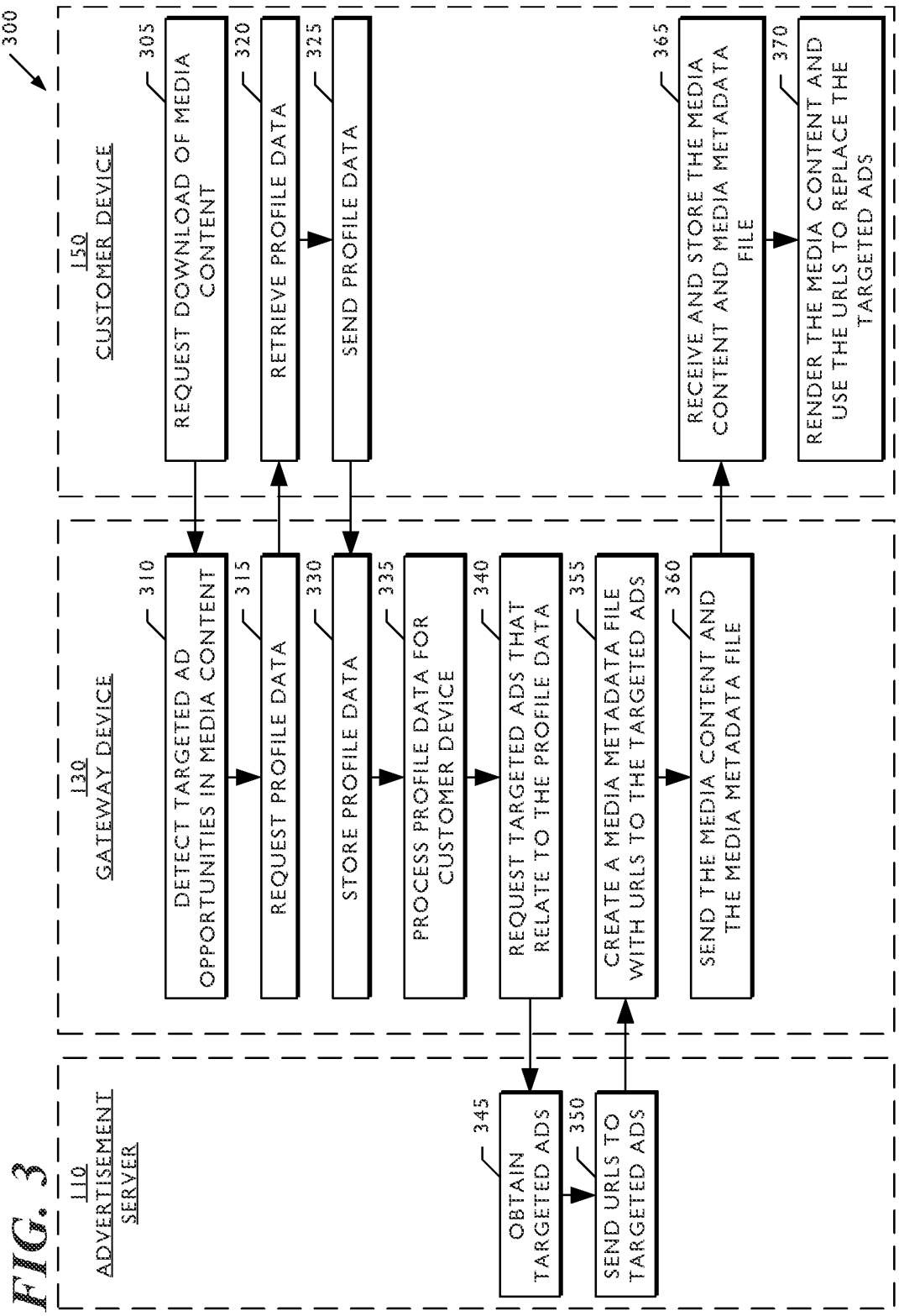
FIG. 3 is a flow diagram that illustrates one embodiment of a method performed by the system for delivering targeted advertisements shown in FIG. 1.

FIG. 3 is a flow diagram that illustrates one embodiment of a method performed by the system for delivering targeted advertisements shown in FIG. 1. The process 300 shown in FIG. 3, with reference to FIG. 1, begins when the customer device 150 sends a request to the gateway device 130 to download a media content file (step 305). In one embodiment, the request to download the media content file is initiation of the transference of the media content file. In one embodiment, the gateway device 130 records and stores the media content file. In one embodiment, before the customer device 150 sends the request to download the media content file, the gateway device 130 verifies that the customer device 150 is an authenticated device in the customer premises 120 network.

After receiving the request to download the media content file from the customer device 150, the process 300 continues when the gateway device 130 obtains the media content file, detects a targeted advertisement opportunity in the media content file (step 310), and sends a request for profile data to the customer device 150 (step 315). In one embodiment, the profile data for the customer device 150 pertains to the behavior of the consumer who typically operates the customer device 150. In another embodiment, the profile data for the customer device 150 pertains to characteristic data for the customer device 150, such as video format, or the like. The customer device 150 receives the request and retrieves the profile data for the customer device 150 (step 320). The customer device 150 sends the profile data to the gateway device 130 (step 325). The gateway device 130 receives and stores the profile data for the customer device 150 (step 330).

After receiving the profile data, the process 300 continues when the gateway device 130 processes the profile data for the customer device 150 (step 335), and sends a request to the advertisement server 110 for targeted advertisements that relate to the profile data (step 340). In one embodiment, targeted advertisements that relate to the profile data for the customer device 150 are targeted advertisements customized and selected based on the behavior of the consumer of the customer device 150 as described in the profile data. In another embodiment, targeted advertisements that relate to the profile data for the customer device 150 are targeted advertisements resulting from a query, where search criteria for the query comprise the profile data for the customer device 150, and where each targeted advertisement satisfies, or matches, at least one search criterion. The advertisement server 110 receives the request for targeted advertisements, obtains targeted advertisements that relate to the profile data (step 345), and sends uniform resource locator (URL) references to the targeted advertisements to the gateway device 130 (step 350). The gateway device 130 receives the URL references to the targeted advertisements from the advertisement server 110, and creates a media metadata file with URL references to the targeted advertisements (step 355). In one embodiment, the URL references to the targeted advertisements in the media metadata file replace the targeted advertisement opportunities in the media content file. The gateway device 130 sends the media content file and the media metadata file to the customer device 150 (step 360). The customer device 150 receives and stores the media content file and media metadata file (step 365), and renders the media content file and uses the URL references in the media metadata file to replace the targeted advertisements on the display 155 (step 370).

Figure 4:
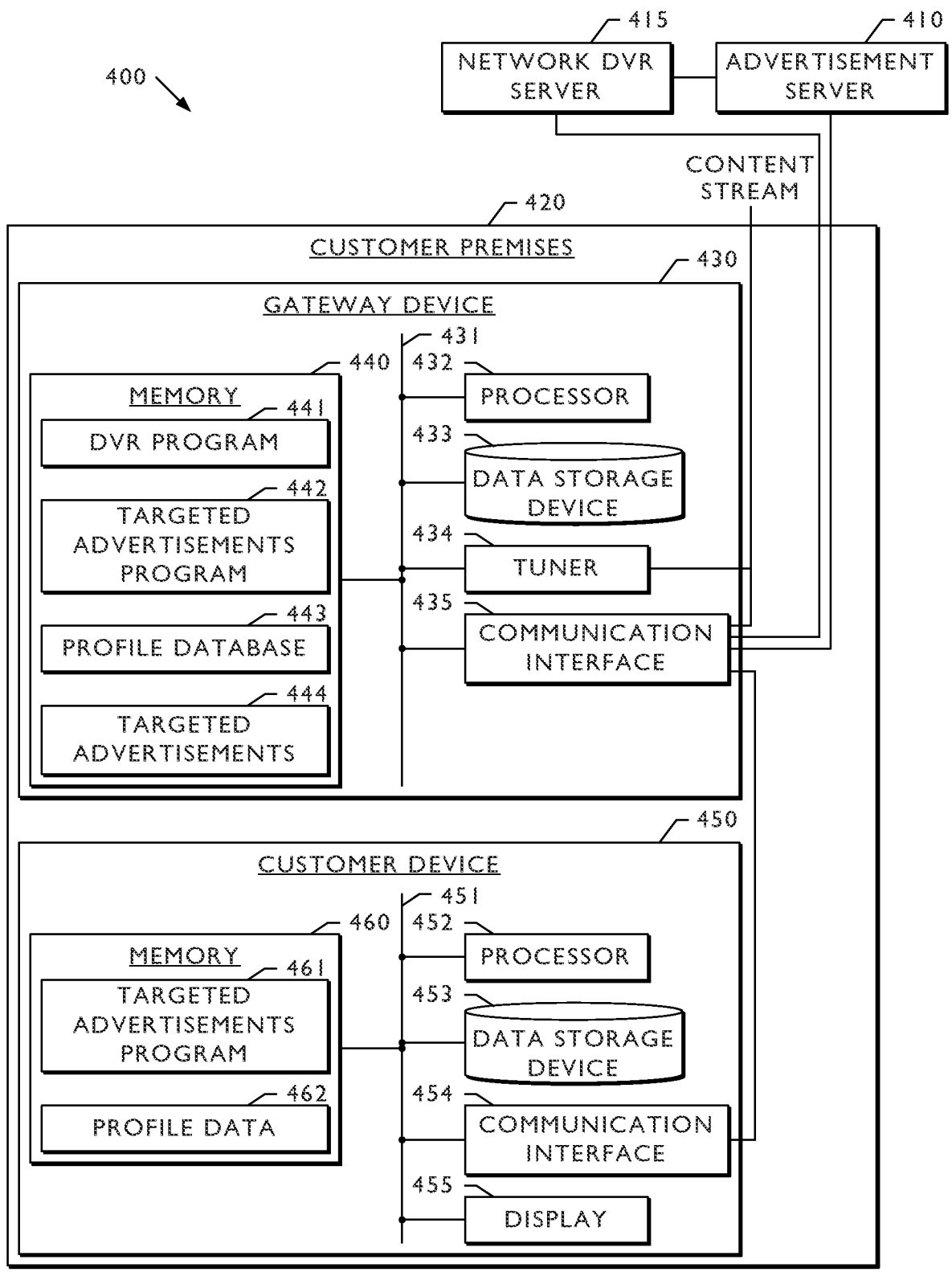
FIG. 4 is a block diagram that illustrates one embodiment of the hardware components of a system for delivering targeted advertisements.

FIG. 4 is a block diagram that illustrates one embodiment of the hardware components of a system for delivering targeted advertisements. The targeted advertisement system 400 shown in FIG. 4 includes an advertisement server 410, network digital video recorder (nDVR) server 415, and customer premises 420 that includes a gateway device 430, and customer device 450. One skilled in the art will appreciate that the targeted advertisement system 400 shown in FIG. 4 may include any number of interconnected advertisement server 410, nDVR server 415, gateway device 430, and customer device 450 components.

The nDVR server 415 shown in FIG. 4 records and stores media content files for the MSO customers. In one embodiment, the customer programs the gateway device 430 at the customer premises 420, but the media content file is recorded and stored by the nDVR server 415, typically located in the MSO headend (not shown). In another embodiment, a third-party records and stores the media content file on the nDVR server 415, and provides the subscriber with access to the media content files.

The advertisement server 410 shown in FIG. 4 serves advertisement content to the gateway device 430. The advertisement server 410 connects to, and communicates with, the gateway device 430 via the nDVR server 415, and an HFC network (not shown). In one embodiment, the HFC network (not shown) includes router and server hardware that provides a content stream to the gateway device 430, and facilitates the communication between the advertisement server 410, nDVR server 415, and gateway device 430. In another embodiment, an Internet Protocol (IP) network (not shown) includes router and server hardware that provides the content stream to the gateway device 430, and facilitates the communication between the advertisement server 410, nDVR server 415, and gateway device 430.

The gateway device 430 shown in FIG. 4 is a CPE device that resides in the customer premises 420. The gateway device 430 is a multifunctional router device. The gateway device 430 includes cable modem functionality to receive television signals that are processed and distributed through the HFC network as a content stream from the MSO headend (not shown), recorded media content files from the nDVR server 415, and targeted advertisements from the advertisement server 410. In one embodiment, the gateway device 430 implements the Data Over Cable Service Interface Specification (DOCSIS) 3.0 standard. The gateway device 430 also includes Wi-Fi router functionality to communicate with the customer premises 420 network of at least one customer device 450. The gateway device 430 also includes programming and storage functionality to store targeted advertisements and replace targeted advertisements in a recorded media content file from the nDVR server 415.

The customer device 450 shown in FIG. 4 is a customer premises 420 computing device such as a mobile phone, smartphone, tablet computer, gaming console, handheld device, personal computer, consumer device, or the like. The customer operates the customer device 450 to receive the media content file from the gateway device 430, and communicate with the nDVR server 415 to access the recorded media content files.

FIG. 4 also illustrates, in detail, one embodiment of the gateway device 430. The gateway device 430 shown in FIG. 4 is a general-purpose computer. A bus 431 is a communication medium connecting a processor 432, data storage device 433 (such as a serial ATA (SATA) hard disk drive, optical drive, small computer system interface (SCSI) disk, solid state disk, flash memory, or the like), tuner 434, communication interface 435, and memory 440 (such as random access memory (RAM), dynamic RAM (DRAM), non-volatile computer memory, flash memory, or the like). The tuner 434 receives television signals that are processed and distributed through the HFC network as a content stream from the MSO headend (not shown). The tuner 434 utilizes drivers including quadrature amplitude modulation (QAM), IP, or the like. The communication interface 435 receives television signals that are processed and distributed through the HFC network as a content stream from the MSO headend (not shown), recorded media content files from the nDVR server 415, and targeted advertisements from the advertisement server 410. The communication interface 435 also communicates with the customer premises 420 network of at least one customer device 450, and allows for two-way communication of data and content between the gateway device 430, advertisement server 410, nDVR server 415, and MSO headend (not shown).

The processor 432 of the gateway device 430 performs the disclosed methods by executing sequences of operational instructions that comprise each computer program resident in, or operative on, the memory 440. The reader should understand that the memory 440 may include operating system, administrative, and database programs that support the programs disclosed in this application. In one embodiment, the configuration of the memory 440 of the gateway device 430 includes a DVR program 441, targeted advertisements program 442, profile database 443, and targeted advertisements 444. The DVR program 441, targeted advertisements program 442, profile database 443, and targeted advertisements 444 are operative components to perform the methods disclosed in the exemplary embodiments depicted in FIG. 5, FIG. 6, FIG. 7, and FIG. 8. When the processor 432 performs the disclosed methods, it stores intermediate results in the memory 440 or data storage device 433. In another embodiment, the processor 432 may swap these programs, or portions thereof, in and out of the memory 440 as needed, and thus may include fewer than all of these programs at any one time.

FIG. 4 also illustrates, in detail, one embodiment of the customer device 450. The customer device 450 shown in FIG. 4 is a general-purpose computer. A bus 451 is a communication medium connecting a processor 452, data storage device 453 (such as a serial ATA (SATA) hard disk drive, optical drive, small computer system interface (SCSI) disk, solid state disk, flash memory, or the like), communication interface 454, display 455, and memory 460 (such as random access memory (RAM), dynamic RAM (DRAM), non-volatile computer memory, flash memory, or the like). The communication interface 454 communicates with the gateway device 430 for the customer premises 420 network. The display 455 is the operator interface for the customer device 450, and displays the media content file received from the gateway device 430.

The processor 452 of the customer device 450 performs the disclosed methods by executing sequences of operational instructions that comprise each computer program resident in, or operative on, the memory 460. The reader should understand that the memory 460 may include operating system, administrative, and database programs that support the programs disclosed in this application. In one embodiment, the configuration of the memory 460 of the customer device 450 includes a targeted advertisements program 461, and profile data 462. The targeted advertisements program 461, and profile data 462 are operative components to perform the methods disclosed in the exemplary embodiments depicted in FIG. 5, FIG. 6, FIG. 7, and FIG. 8. When the processor 452 performs the disclosed methods, it stores intermediate results in the memory 460 or data storage device 453. In another embodiment, the processor 452 may swap these programs, or portions thereof, in and out of the memory 460 as needed, and thus may include fewer than all of these programs at any one time.

Figure 5:
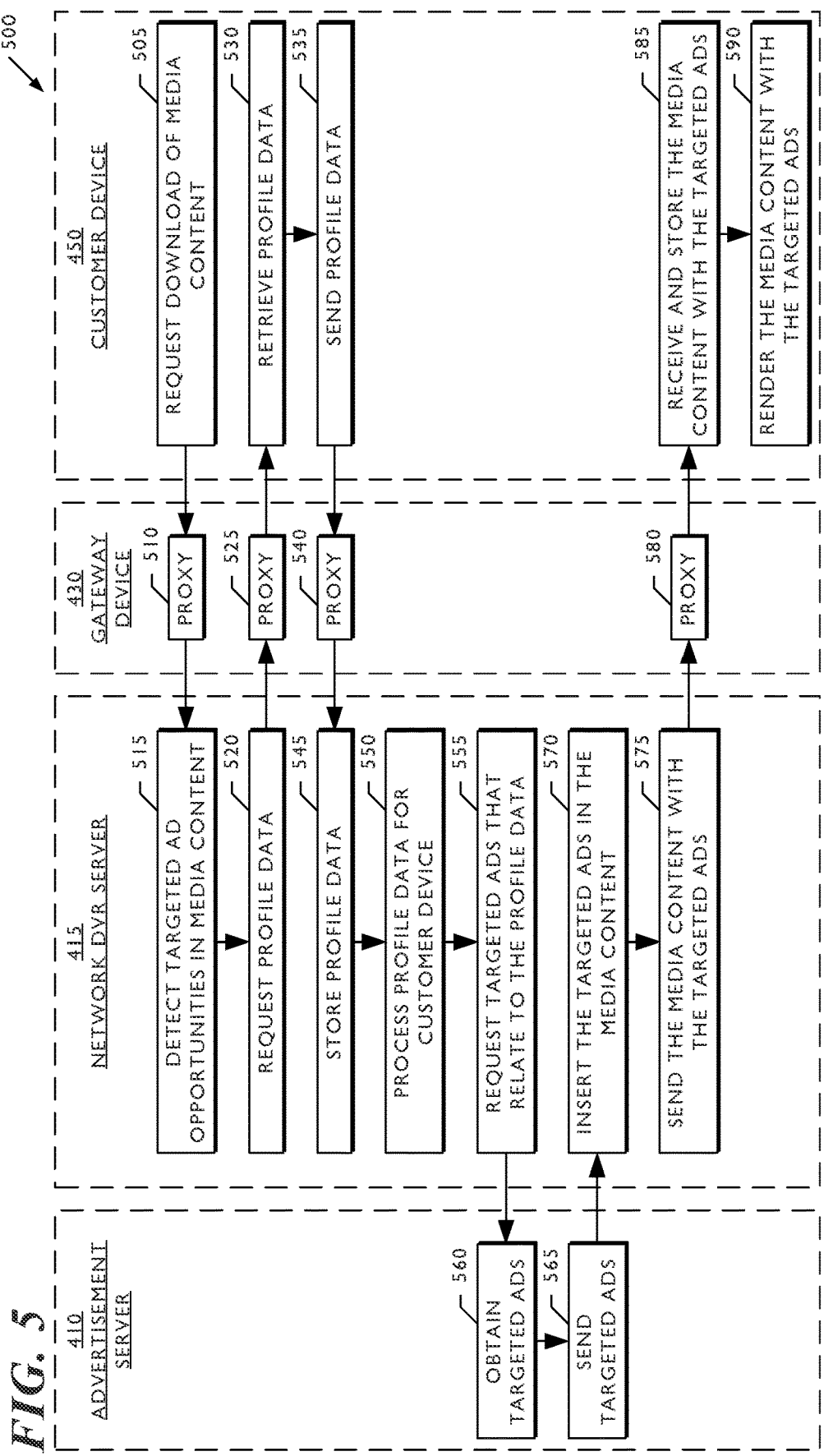
FIG. 5 is a flow diagram that illustrates one embodiment of a method performed by the system for delivering targeted advertisements shown in FIG. 4.

FIG. 5 is a flow diagram that illustrates one embodiment of a method performed by the system for delivering targeted advertisements shown in FIG. 4. The process 500 shown in FIG. 5, with reference to FIG. 4, begins when the customer device 450 sends a request to the gateway device 430 to download a media content file (step 505). The gateway device 430 acts as a proxy server and forwards the request to download the media content file to the network DVR server 415 (step 510). In one embodiment, the request to download the media content file is initiation of the transference of the media content file. In one embodiment, the network DVR server 415 records and stores the media content file. In one embodiment, before the customer device 450 sends the request to download the media content file, the gateway device 430 verifies that the customer device 450 is an authenticated device in the customer premises 420 network.

After receiving the request to download the media content file from the customer device 450, the process 500 continues when the network DVR server 415 obtains the media content file, detects a targeted advertisement opportunity in the media content file (step 515), and sends a request for profile data to the gateway device 430 (step 520). The gateway device 430 acts as a proxy server and forwards the request for the profile data to the customer device 450 (step 525). In one embodiment, the profile data for the customer device 450 pertains to the behavior of the consumer who typically operates the customer device 450. In another embodiment, the profile data for the customer device 450 pertains to characteristic data for the customer device 450, such as video format, or the like. The customer device 450 receives the request and retrieves the profile data for the customer device 450 (step 530). The customer device 450 sends the profile data to the gateway device 430 (step 535). The gateway device 430 acts as a proxy server and forwards the profile data to the network DVR server 415 (step 540). The network DVR server 415 receives and stores the profile data for the customer device 450 (step 545).

After receiving the profile data, the process 500 continues when the network DVR server 415 processes the profile data for the customer device 450 (step 550), and sends a request to the advertisement server 410 for targeted advertisements that relate to the profile data (step 555). In one embodiment, targeted advertisements that relate to the profile data for the customer device 450 are targeted advertisements customized and selected based on the behavior of the consumer of the customer device 450 as described in the profile data. In another embodiment, targeted advertisements that relate to the profile data for the customer device 450 are targeted advertisements resulting from a query, where search criteria for the query comprise the profile data for the customer device 450, and where each targeted advertisement satisfies, or matches, at least one search criterion. The advertisement server 410 receives the request for targeted advertisements, obtains targeted advertisements that relate to the profile data (step 560), and sends the targeted advertisements to the network DVR server 415 (step 565). The network DVR server 415 receives the targeted advertisements from the advertisement server 410, and inserts the targeted advertisements in the media content file (step 570). In one embodiment, the insertion of the targeted advertisements replaces the targeted advertisement opportunities in the media content file with the targeted advertisements received from the advertisement server 410. The network DVR server 415 sends the media content file with the targeted advertisements to the gateway device 430 (step 575). The gateway device 430 acts as a proxy server and forwards the media content file with the targeted advertisements to the customer device 450 (step 580). The customer device 450 receives and stores the media content file with the targeted advertisements (step 585), and renders the media content file with the targeted advertisements on the display 455 (step 590).

Figure 6:
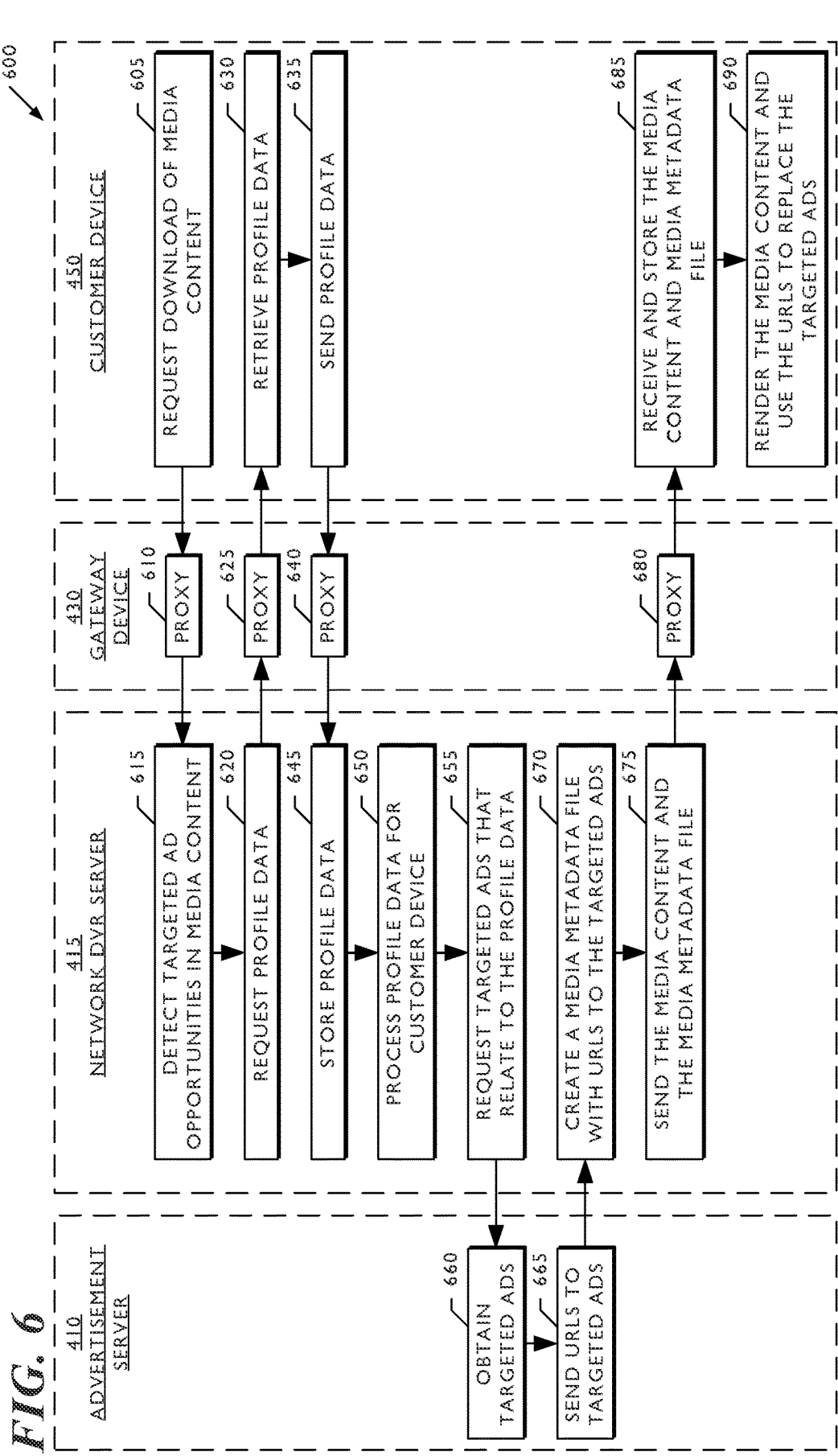
FIG. 6 is a flow diagram that illustrates one embodiment of a method performed by the system for delivering targeted advertisements shown in FIG. 4.

FIG. 6 is a flow diagram that illustrates one embodiment of a method performed by the system for delivering targeted advertisements shown in FIG. 4. The process 600 shown in FIG. 6, with reference to FIG. 4, begins when the customer device 450 sends a request to the gateway device 430 to download a media content file (step 605). The gateway device 430 acts as a proxy server and forwards the request to download the media content file to the network DVR server 415 (step 610). In one embodiment, the request to download the media content file is initiation of the transference of the media content file. In one embodiment, the network DVR server 415 records and stores the media content file. In one embodiment, before the customer device 450 sends the request to download the media content file, the gateway device 430 verifies that the customer device 450 is an authenticated device in the customer premises 420 network.

After receiving the request to download the media content file from the customer device 450, the process 600 continues when the network DVR server 415 obtains the media content file, detects a targeted advertisement opportunity in the media content file (step 615), and sends a request for profile data to the gateway device 430 (step 620). The gateway device 430 acts as a proxy server and forwards the request for the profile data to the customer device 450 (step 625). In one embodiment, the profile data for the customer device 450 pertains to the behavior of the consumer who typically operates the customer device 450. In another embodiment, the profile data for the customer device 450 pertains to characteristic data for the customer device 450, such as video format, or the like. The customer device 450 receives the request and retrieves the profile data for the customer device 450 (step 630). The customer device 450 sends the profile data to the gateway device 430 (step 635). The gateway device 430 acts as a proxy server and forwards the profile data to the network DVR server 415 (step 640). The network DVR server 415 receives and stores the profile data for the customer device 450 (step 645).

After receiving the profile data, the process 600 continues when the network DVR server 415 processes the profile data for the customer device 450 (step 650), and sends a request to the advertisement server 410 for targeted advertisements that relate to the profile data (step 655). In one embodiment, targeted advertisements that relate to the profile data for the customer device 450 are targeted advertisements customized and selected based on the behavior of the consumer of the customer device 450 as described in the profile data. In another embodiment, targeted advertisements that relate to the profile data for the customer device 450 are targeted advertisements resulting from a query, where search criteria for the query comprise the profile data for the customer device 450, and where each targeted advertisement satisfies, or matches, at least one search criterion. The advertisement server 410 receives the request for targeted advertisements, obtains targeted advertisements that relate to the profile data (step 660), and sends URL references to the targeted advertisements to the network DVR server 415 (step 665). The network DVR server 415 receives the URL references to the targeted advertisements from the advertisement server 410, and creates a media metadata file with URL references to the targeted advertisements (step 670). In one embodiment, the URL references to the targeted advertisements in the media metadata file replace the targeted advertisement opportunities in the media content file. The network DVR server 415 sends the media content file and media metadata file to the gateway device 430 (step 675). The gateway device 430 acts as a proxy server and forwards the media content file and media metadata file to the customer device 450 (step 680). The customer device 450 receives and stores the media content file and media metadata file (step 685), and renders the media content file and uses the URL references in the media metadata file to replace the targeted advertisements on the display 455 (step 690).

Figure 7:
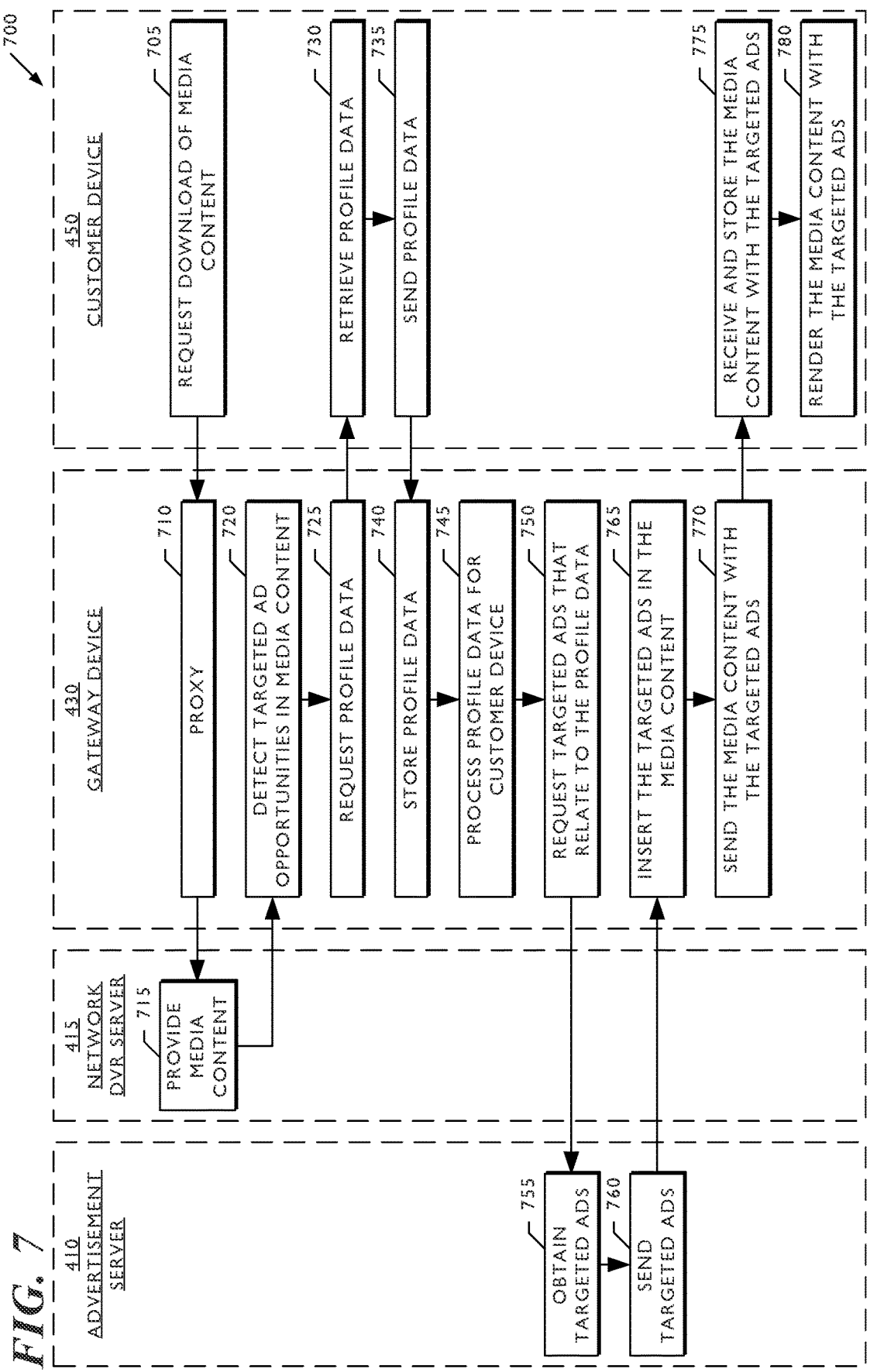
FIG. 7 is a flow diagram that illustrates one embodiment of a method performed by the system for delivering targeted advertisements shown in FIG. 4.

FIG. 7 is a flow diagram that illustrates one embodiment of a method performed by the system for delivering targeted advertisements shown in FIG. 4. The process 700 shown in FIG. 7, with reference to FIG. 4, begins when the customer device 450 sends a request to the gateway device 430 to download a media content file (step 705). The gateway device 430 acts as a proxy server and forwards the request to download the media content file to the network DVR server 415 (step 710). In one embodiment, the request to download the media content file is initiation of the transference of the media content file. In one embodiment, the network DVR server 415 records and stores the media content file. In one embodiment, before the customer device 450 sends the request to download the media content file, the gateway device 430 verifies that the customer device 450 is an authenticated device in the customer premises 420 network.

After receiving the request to download the media content file from the customer device 450, the process 700 continues when the network DVR server 415 obtains the media content file, and provides the media content file to the gateway device 430 (step 715). The gateway device 430 receives the media content file, detects a targeted advertisement opportunity in the media content file (step 720), and sends a request for profile data to the customer device 450 (step 725). In one embodiment, the profile data for the customer device 450 pertains to the behavior of the consumer who typically operates the customer device 450. In another embodiment, the profile data for the customer device 450 pertains to characteristic data for the customer device 450, such as video format, or the like. The customer device 450 receives the request and retrieves the profile data for the customer device 450 (step 730). The customer device 450 sends the profile data to the gateway device 430 (step 735). The gateway device 430 receives and stores the profile data for the customer device 450 (step 740).

After receiving the profile data, the process 700 continues when the gateway device 430 processes the profile data for the customer device 450 (step 745), and sends a request to the advertisement server 410 for targeted advertisements that relate to the profile data (step 750). In one embodiment, targeted advertisements that relate to the profile data for the customer device 450 are targeted advertisements customized and selected based on the behavior of the consumer of the customer device 450 as described in the profile data. In another embodiment, targeted advertisements that relate to the profile data for the customer device 450 are targeted advertisements resulting from a query, where search criteria for the query comprise the profile data for the customer device 450, and where each targeted advertisement satisfies, or matches, at least one search criterion. The advertisement server 410 receives the request for targeted advertisements, obtains targeted advertisements that relate to the profile data (step 755), and sends the targeted advertisements to the gateway device 430 (step 760). The gateway device 430 receives the targeted advertisements from the advertisement server 410, and inserts the targeted advertisements in the media content file provided by the network DVR server 415 (step 765). In one embodiment, the insertion of the targeted advertisements replaces the targeted advertisement opportunities in the media content file with the targeted advertisements received from the advertisement server 410. The gateway device 430 sends the media content file with the targeted advertisements to the customer device 450 (step 770). The customer device 450 receives and stores the media content file with the targeted advertisements (step 775), and renders the media content file with the targeted advertisements on the display 455 (step 780).

Figure 8:
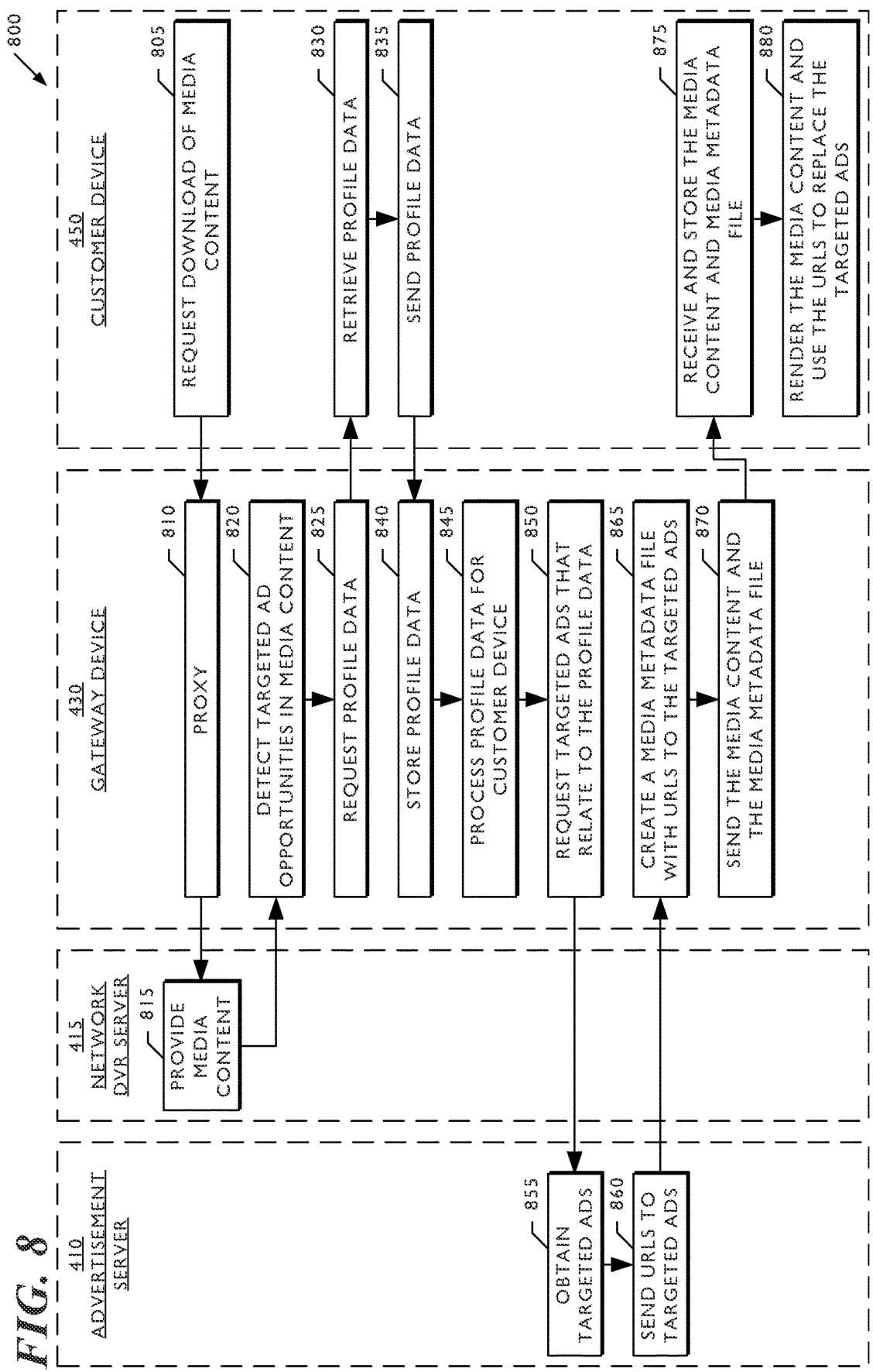
FIG. 8 is a flow diagram that illustrates one embodiment of a method performed by the system for delivering targeted advertisements shown in FIG. 4.

FIG. 8 is a flow diagram that illustrates one embodiment of a method performed by the system for delivering targeted advertisements shown in FIG. 4. The process 800 shown in FIG. 8, with reference to FIG. 4, begins when the customer device 450 sends a request to the gateway device 430 to download a media content file (step 805). The gateway device 430 acts as a proxy server and forwards the request to download the media content file to the network DVR server 415 (step 810). In one embodiment, the request to download the media content file is initiation of the transference of the media content file. In one embodiment, the network DVR server 415 records and stores the media content file. In one embodiment, before the customer device 450 sends the request to download the media content file, the gateway device 430 verifies that the customer device 450 is an authenticated device in the customer premises 420 network.

After receiving the request to download the media content file from the customer device 450, the process 800 continues when the network DVR server 415 obtains the media content file, and provides the media content file to the gateway device 430 (step 815). The gateway device 430 receives the media content file, detects a targeted advertisement opportunity in the media content file (step 820), and sends a request for profile data to the customer device 450 (step 825). In one embodiment, the profile data for the customer device 450 pertains to the behavior of the consumer who typically operates the customer device 450. In another embodiment, the profile data for the customer device 450 pertains to characteristic data for the customer device 450, such as video format, or the like. The customer device 450 receives the request and retrieves the profile data for the customer device 450 (step 830). The customer device 450 sends the profile data to the gateway device 430 (step 835). The gateway device 430 receives and stores the profile data for the customer device 450 (step 840).

After receiving the profile data, the process 800 continues when the gateway device 430 processes the profile data for the customer device 450 (step 845), and sends a request to the advertisement server 410 for targeted advertisements that relate to the profile data (step 850). In one embodiment, targeted advertisements that relate to the profile data for the customer device 450 are targeted advertisements customized and selected based on the behavior of the consumer of the customer device 450 as described in the profile data. In another embodiment, targeted advertisements that relate to the profile data for the customer device 450 are targeted advertisements resulting from a query, where search criteria for the query comprise the profile data for the customer device 450, and where each targeted advertisement satisfies, or matches, at least one search criterion. The advertisement server 410 receives the request for targeted advertisements, obtains targeted advertisements that relate to the profile data (step 855), and sends URL references to the targeted advertisements to the gateway device 430 (step 860). The gateway device 430 receives the URL references to the targeted advertisements from the advertisement server 410, and creates a media metadata file with URL references to the targeted advertisements (step 865). In one embodiment, the URL references to the targeted advertisements in the media metadata file replace the targeted advertisement opportunities in the media content file. The gateway device 430 sends the media content file provided by the network DVR server 415 and media metadata file to the customer device 450 (step 870). The customer device 450 receives and stores the media content file and media metadata file (step 875), and renders the media content file and uses the URL references in the media metadata file to replace the targeted advertisements on the display 455 (step 880).

Although the disclosed embodiments describe a fully functioning method for delivering targeted advertisements to a mobile device, the reader should understand that other equivalent embodiments exist. Since numerous modifications and variations will occur to those reviewing this disclosure, the method implemented in a computer system for delivering targeted advertisements to a mobile device is not limited to the exact construction and operation illustrated and disclosed. Accordingly, this disclosure intends all suitable modifications and equivalents to fall within the scope of the claims.

We claim:

1. A network gateway device comprising customer premises equipment (CPE), configured to be communicatively coupled to a wireless network, for transferring media to a network of customer devices device on connected via the wireless network, the network gateway device comprising:
   a memory device;
   a communication interface for communicatively coupling the network gateway device (i) to a broadband network for receiving media content from a headend, and (ii) to the wireless network; and
   one or more processors disposed in communication with the communication interface and with the memory device, the one or more processors configured to:
      receive a request from a customer device of the network of customer devices, via the wireless network, to download a media content file previously received by the network gateway device and recorded in the memory device;

detect a previously inserted targeted advertisement in the media content file;

receive, from the customer device via the wireless network, profile data for the customer device comprising behavior data associated with a user operating the customer device;

transmit, upon receiving the profile data, a request, to an advertisement server, for targeted advertisements that relate to the profile data;

receive, from an advertisement server via the broadband network, uniform resource locator (URL) references to the targeted advertisements that relate to the behavior data;

in response to receiving the URL references from the advertisement server, create a media metadata file with the URL references to the targeted advertisements and insert the media metadata file with URL references in the media content file such that the URL references to the targeted advertisement in the media metadata file replace the previously inserted targeted advertisement in the media content file; and send the media content file including the media metadata file with the URL references, via the wireless network, to the customer device, wherein the customer device renders the media content file and uses the URL references in the media metadata file to replace the targeted advertisements on a display.

2. The network gateway device of claim 1, wherein the customer device is an authenticated customer device on the wireless network.

3. The network gateway device of claim 1, wherein the wireless network comprises a private customer premises network.

4. The network gateway device of claim 1, wherein to receive the profile data for the customer device, the one or more processors are further configured to:

send a request for the profile data to the customer device;
receive the profile data from the customer device;
store the profile data; and
associate the profile data with the customer device.

5. The network gateway device of claim 1, wherein the profile data further includes characteristic data for the customer device.

6. A method for delivering targeted advertisements to a customer device, of a network of customer devices on a wireless network, via a communication interface configured for communicating with a broadband network for receiving media content from a headend, and with the wireless network, the method comprising:

receiving, in a network gateway device, a request from the customer device of the network of customer devices, via the wireless network, to download a media content file previously received by the network gateway device and recorded in the memory device;

detecting, by a processor of the network gateway device, a previously inserted targeted advertisement in the media content file;

receiving, from the customer device via the wireless network, profile data for the customer device comprising behavior data associated with a user operating the customer device;

upon receiving the profile data from the customer device, transmitting a request, to an advertisement server, for targeted advertisements that relate to the profile data;

receiving, from the advertisement server via the broadband network, uniform resource locator (URL) references to targeted advertisements that relate to the behavior data;

in response to receiving the URL references from the advertisement server, creating, by the processor of the network gateway device, a media metadata file with the URL references to the targeted advertisements and inserting the media metadata file with URL references in the media content file such that the URL references to the targeted advertisement in the media metadata file replace the previously inserted targeted advertisement in the media content file; and sending, from the network gateway device, via the wireless network, to the customer device, the media content file including the media metadata file with the URL references, wherein the customer device renders the media content file and uses the URL references in the media metadata file to replace the targeted advertisements on a display.

7. The method of claim 6, wherein the customer device is an authenticated customer device on the wireless network.

8. The method of claim 6, wherein the wireless network comprises a private customer premises network.

9. The method of claim 6, wherein the receiving of the profile data for the customer device further comprises:

sending a request for the profile data to the customer device;
receiving the profile data from the customer device;
storing the profile data; and
associating the profile data with the customer device.

10. The method of claim 6, wherein the profile data further includes characteristic data for the customer device.

11. A non-transitory computer-readable medium, comprising computer-executable instructions for delivering targeted advertisements to a customer device, from a network of customer devices on a wireless network, wherein the instructions, when executed by one or more processors of a network gateway device communicatively coupled to the wireless network, cause the one or more processors of the network gateway device to perform steps of:

receiving a request from the customer device, of the network of customer devices, to download a media content file previously received by the network gateway device and recorded in a memory device;

detecting a previously inserted targeted advertisement in the media content file;

receiving profile data for the customer device comprising behavior data associated with a user operating the customer device;

upon receiving the profile data from the customer device, transmitting a request, to an advertisement server, for targeted advertisements that relate to the profile data;

receiving, from the advertisement server, via a broadband network, uniform resource locator (URL) references to targeted advertisements that relate to the behavior data;

in response to receiving the URL references from the advertisement server, creating a media metadata file with the URL references to the targeted advertisements and inserting the media metadata file with URL references in the media content file such that the URL references to the targeted advertisement in the media metadata file replace the previously inserted targeted advertisement in the media content file; and sending, via the wireless network, to the customer device, the media content file including the media metadata file with the URL references, wherein the customer device renders the media content file and uses the URL references in the media metadata file to replace the targeted advertisements on a display.

\* \* \* \* \*